US012041390B1

(12) United States Patent
Sharaby et al.

(10) Patent No.: US 12,041,390 B1
(45) Date of Patent: Jul. 16, 2024

(54) SINGLE CAMERA-BASED DUPLEX OPTICAL IMAGING APPARATUS FOR EXTRACTING IDENTY DATA FROM ONE OR MORE IDENTIFCATION DOCUMENTS

(71) Applicants: Giyora Sharaby, Neve Yarak (IL); Daniel Hatzav, Tel Aviv (IL); Lee Shadmi, Kiryat Ata (IL); Yuval Lichter, Tel Aviv (IL); Guy Hatzav, Hod Hasharon (IL)

(72) Inventors: Giyora Sharaby, Neve Yarak (IL); Daniel Hatzav, Tel Aviv (IL); Lee Shadmi, Kiryat Ata (IL); Yuval Lichter, Tel Aviv (IL); Guy Hatzav, Hod Hasharon (IL)

(73) Assignee: Giyora Sharaby, Neve Yarak (IL)

( * ) Notice: Subject to any disclaimer, the term of this patent is extended or adjusted under 35 U.S.C. 154(b) by 0 days.

(21) Appl. No.: 18/444,457

(22) Filed: Feb. 16, 2024

(51) Int. Cl.
*H04N 23/56* (2023.01)
*H04N 7/18* (2006.01)
*H04N 23/55* (2023.01)
*H04N 23/90* (2023.01)

(52) U.S. Cl.
CPC ............ *H04N 7/188* (2013.01); *H04N 23/55* (2023.01); *H04N 23/56* (2023.01); *H04N 23/90* (2023.01)

(58) Field of Classification Search
CPC ...... H04N 1/19594; H04N 1/195; H04N 1/10; H04N 2201/0422; H04N 1/00564; H04N 1/00681; H04N 1/00689; H04N 1/00734; H04N 1/00755
USPC ....................................................... 348/143
See application file for complete search history.

(56) References Cited

U.S. PATENT DOCUMENTS

| 6,348,962 | B1 * | 2/2002 | Nakagawa | H04N 1/2036 399/374 |
| 7,911,655 | B2 * | 3/2011 | Hatzav | G03B 15/00 358/475 |
| 8,830,328 | B2 * | 9/2014 | Hatzav | G06V 30/142 358/450 |
| 2009/0002774 | A1 * | 1/2009 | King | H04N 1/3876 382/275 |
| 2009/0073503 | A1 * | 3/2009 | Lebaschi | H04N 1/193 358/450 |
| 2011/0012836 | A1 | 6/2011 | Hatzav et al. | |

(Continued)

FOREIGN PATENT DOCUMENTS

CN   207052001 U  *  2/2018
GB   2580308 A    *  7/2020  ........... G06K 7/1413

*Primary Examiner* — Masum Billah
(74) *Attorney, Agent, or Firm* — Snell & Wilmer L.L.P.

(57) ABSTRACT

An imaging apparatus for imaging and extracting data of at least one side of an identification document, such as an identity document, having a first side and a second side, the apparatus including a processor and memory coupled to operate with the processor, an activation unit, a camera unit mounted inside an imaging-optical-chamber at a preconfigured spatial location and inclination, wherein the camera unit includes an image sensor configured to receive the respective images of both the first (upper) side and the second (lower) side of the identification document. Upon activating the activation unit, the processor facilitates a computerized method that includes acquiring an image of both the upper and lower sides of the document, by the image sensor, substantially simultaneously and extract data thereof.

20 Claims, 7 Drawing Sheets

(56) References Cited

U.S. PATENT DOCUMENTS

2013/0107056 A1* 5/2013 Hatzav ................ G06V 30/142
348/E7.085

* cited by examiner

SINGLE CAMERA-BASED DUPLEX OPTICAL IMAGING APPARATUS FOR EXTRACTING IDENTY DATA FROM ONE OR MORE IDENTIFCATION DOCUMENTS

FIELD OF THE INVENTION

The present invention relates to imaging apparatuses and computerized methods for imaging and extracting identity data and more particularly, the present invention relates to an apparatus for optically acquiring, in one take, digital image frames of both sides of an identify document such as driver's licenses, and other similar identification documents so as to extract identify data automatically with machine vision tools. Imaging both sides of a document in one take is facilitated by subdividing the physical image sensor of the camera into two sections, one for each side of the document.

BACKGROUND OF THE INVENTION

There exist in today's market imaging devices capable of imaging documents such as IDs, driver's license, business identifying documents, passports, medical identifying documents and the like. In imaging devices that include an imaging sensor array, based on technologies such as CMOS, it is required to illuminate the imaged document. It is desired for the illumination to be of high intensity and substantially uniform, in order to obtain a substantially true image of the imaged document.

The document is typical place on the surface of a substantially flat and substantially non-opaque panel, typically, with no limitation, made of glass (herein, also referred to as "glass-window"). But the glass surface and the imaged document are also a reflective surface, returning a portion of the incident light rays colliding with the non-opaque glass surface. Thereby, the image frame acquired from the imaged document is distorted. An internal light source that directly illuminates the glass-window bring are reflected from the glass surface, thereby forming "hotspots" that distort the uniformity of the illumination of the imaged document, and thereby causing the image of the imaged document not to be a substantially true image of the imaged document.

U.S. Pat. No. 7,911,655 and US patent application 20110128360, by Hatzav et al., provide apparatuses for acquiring digital image frames of one (or both sides, when using two cameras) of identification documents, having an illumination system configuration that reduces the hotspot problem, by disposing the light sources outside the field of view (FOV) of the camera. However, it requires two cameras to image both sides of a document, in one take.

The hotspot problem is also addressed by Hatzav et al. in U.S. Pat. No. 8,830,328, provides a dual cameras based duplex imaging apparatus for acquiring digital image frames of one or both sides of identification documents such as driver's licenses, and other identity or identifying documents so as to extract data automatically with machine vision tools. The apparatus of the present does not require an ejection mechanism for removing the document from the apparatus.

U.S. Pat. No. 8,830,328 does address the need for imaging both sides of a document, such as an identification document but the solution provided requires at least one camera for each side of the document. However, it would be advantageous to be able to acquire an image of both sides of the document with a single camera, and further advantageous to be able to acquire that image in one take, that is, a single exposure.

In prior art imaging device for imaging documents that facilitates imaging both sides of the document (also referred to as a "duplex imaging device" or a "duplex imaging apparatus"), substantially simultaneously, an ejection mechanism is required for removing the document from the duplex imaging device, since the whole document is typically inserted in a slot between two glass windows. The ejection mechanism is typically complex, cumbersome and burdensome the duplex imaging device as a whole.

Thus, there is a need for, and it would be advantageous to have a duplex imaging apparatus that facilitates acquiring digital images of both sides of a document, in one take.

SUMMARY OF THE INVENTION

In view of the limitations now presented in the prior art, the present invention provides a new, simple and useful duplex imaging, optical apparatus for imaging identifying documents that in effect, facilitates imaging both sides of one or more documents in one take. This is facilitated by subdividing the physical image sensor of the imaging camera into two sections, one for each side of the identifying document.

In effect, the present invention facilitates optically acquiring, in one take, two digital image frames: eighter both sides of a single document such as driver's licenses, and other similar documents; or selected one side of two documents, placed back-to-back and extracting data thereof.

The present invention is an improved duplex imaging apparatus for imaging identifying documents, wherein each side of the document is illuminated by a respective light source. Each light source illuminates one document, and at a preconfigured angle and spatial position with respect to the document and with respect to the spatial position of the respective image sensor section. Both the first and second light sources are spatially positioned such that each illuminate the respective surface of the document in a preconfigured angle, such that the imaged light sources themselves fall outside the field of view (FOV) of the image sensor.

According to the teachings of the present invention, there is provided a duplex imaging apparatus for imaging at least one side of a document, such as an identity document, having a first side and a second side, the apparatus including a processor and memory coupled to operate with the processor, an activation unit, a camera unit mounted inside an imaging-optical-chamber at a preconfigured spatial location and inclination, wherein the camera unit includes an image sensor configured to receive the respective images of both a first (upper) side and a second (lower) side of the document.

Typically, with no limitations, the first side of the document is the upper and the second sides of the document is the lower side of the document.

The duplex imaging apparatus further includes a substantially horizontal glass-window, wherein the document is operatively disposed on the external (typically the upper) surface of the glass-window, and wherein the second side of the document, is disposed adjacently to the external surface of the glass-window.

The duplex imaging apparatus further includes a first light-source configured to illuminate the upper side of the document placed on top of the glass-window, from a preconfigured spatial position, situated at a preconfigured distance from the upper side of the document, at a preconfigured angle with respect to the upper surface of the document, configured to form an upper-side-image of the upper side of the document.

The duplex imaging apparatus further includes a first set of folding mirrors having at least one folding mirror, wherein each folding mirror is situated at preconfigured spatial position and inclination, and at a preconfigured distance from the upper side of the document, wherein the first set of folding mirrors is configured to forward the upper-side-image towards a first section of the image sensor.

The duplex imaging apparatus further includes a second light-source configured to illuminate the lower side of the document placed on top of the glass-window, from a preconfigured spatial position, situated at a preconfigured distance from the lower side of the document, at a preconfigured angle with respect to the lower surface of the document, configured to form a lower-side-image of the lower side of the document.

The duplex imaging apparatus further includes a second set of folding mirrors having at least one folding mirror, wherein each folding mirror is situated at preconfigured spatial position and inclination, and at a preconfigured distance from the lower side of the document; wherein the second set of folding mirrors is configured to forward the lower-side-image towards a second section of the image sensor.

Upon activating the activation unit, the processor facilitates acquiring an image of both the upper and lower sides of the document, by the image sensor, substantially simultaneously and extracting identifying data thereof.

Either the first set of folding mirrors, the second set of folding mirrors or both, may include:
(a) a first folding mirror that is situated at a preconfigured spatial position and inclination, and at a preconfigured distance from a first side of the document; and
(b) a second folding mirror that is situated at preconfigured spatial position and inclination, and at a preconfigured distance from the first folding mirror,
wherein the illuminated first side of the document forms a flow of the formed image of the first side of the document towards the first folding mirror; and from the first folding mirror towards the second folding mirror; and from the second folding mirror towards a preconfigured section of the image sensor.

Optionally, the first side of the document is the upper side of the document; and the second side of the document is the lower side of the document.

Either the first set of folding mirrors, the second set of folding mirrors or both, may include a third folding mirror that is situated at preconfigured spatial position and inclination, and at a preconfigured distance from the respective surface of the document, and from the third folding mirror towards a preconfigured section of the image sensor. The illuminated respective side of the document forms a flow of the formed image of the respective side of the document towards the third folding mirror; and from the third folding mirror towards a respective preconfigured section of the image sensor.

Optionally, the activation unit is selected from a group including a physical button, a computerized software button, and a document motion detector.

Preferably, both the first and second light sources are spatially positioned such that each illuminates the respective surface of the document in a preconfigured angle, such that the imaged light sources themselves fall outside the field of view (FOV) of the image sensor.

Optionally, the folding mirrors are spatially situated at a preconfigured spatial position and inclination to direct the flow of the respective imaged surface to the respective section of the image sensor.

Optionally, each individual light source of the light source configuration is selected from the group of light sources type, including infra-red (IR), ultra violate (UV) and visible light (VL) or any type of light that can affect the camera sensor.

Optionally, each individual light source of the light source configuration is selected from the group including LED, halogen light sources and fluorescence image.

Optionally, the glass-window is down sloped towards a preferred imaging region of the glass-window.

Preferably, all walls of the optical chamber are opaque, except for the glass-window.

Preferably, all internal walls of the optical-chambers, except for the glass-windows, are painted black.

Optionally, the upper side of the document is illuminated via a folding mirror.

Optionally, the lower side of the document is illuminated via a folding mirror.

According to further teachings of the present invention, there is provided a computerized method including the steps of:
(a) providing a duplex imaging apparatus including:
  i. a processor;
  ii. an activation unit;
  iii. a camera unit mounted inside an imaging-optical-chamber at a preconfigured spatial location and inclination, wherein the camera unit includes an image sensor configured to receive the respective images of both the first (upper) side and the second (lower) side of the document;
  iv. a substantially horizontal glass-window, wherein the document is operatively disposed on the external (upper) surface of the glass-window, wherein the second side of the document, is disposed adjacently to the external surface of the glass-window;
  v. a first light-source configured to illuminate the upper side of the document placed on top of the glass-window, from a preconfigured spatial position, situated at a preconfigured distance from the upper side of the document, at a preconfigured angle with respect to the upper surface of the document, configured to form an upper-side-image of the upper side of the document;
  vi. a first set of folding mirrors having at least one folding mirror, wherein each folding mirror is situated at preconfigured spatial position and inclination, and at a preconfigured distance from the upper side of the document, wherein the first set of folding mirrors is configured to forward the upper-side-image towards a first section of the image sensor;
  vii. a second light-source configured to illuminate the lower side of the document placed on top of the glass-window, from a preconfigured spatial position, situated at a preconfigured distance from the lower side of the document, at a preconfigured angle (with respect to the lower surface of the document, configured to form a lower-side-image of the lower side of the document; and
  viii. a second set of folding mirrors having at least one folding mirror, wherein each folding mirror is situated at preconfigured spatial position and inclination, and at a preconfigured distance from the lower side of the document; wherein the second set of folding mirrors is configured to forward the lower-side-image towards a second section of the image sensor,
wherein upon activating the activation unit, the processor facilitates acquiring an image of both the upper and lower sides of the document, by the image sensor, substantially simultaneously and extracting identifying data thereof.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

Before explaining embodiments of the invention in detail, it is to be understood that the invention is not limited in its application to the details of construction and the arrangement of the components set forth in the host description or illustrated in the drawings. Unless otherwise defined, all technical and scientific terms used herein have the same meaning as commonly understood by one of ordinary skill in the art of the invention belongs. Any methods and examples provided herein are illustrative only and not intended to be limiting.

Figure 1:
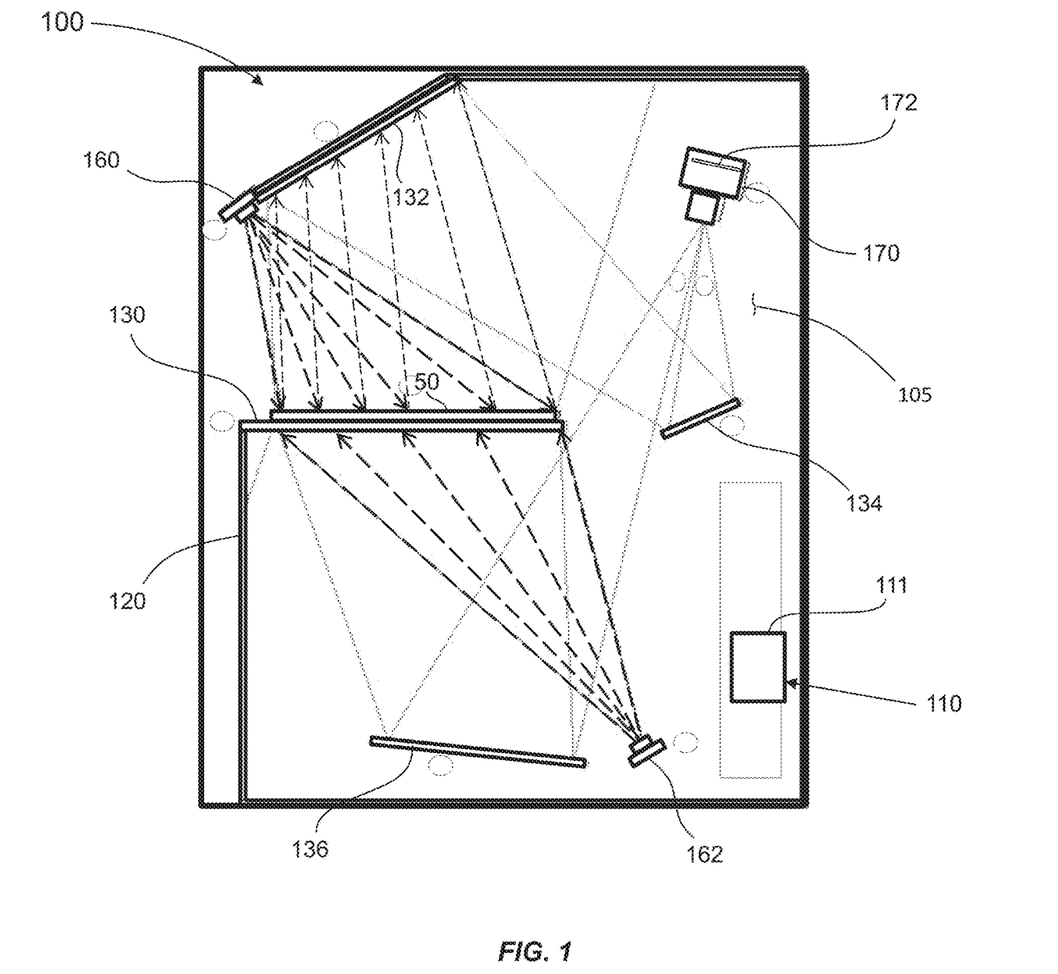
FIG. 1 is a side view illustration of a symmetric duplex imaging apparatus having an enclosed imaging-optical-chamber, according to embodiments of the present invention.

Reference is now made to FIG. 1, a side view illustration of a duplex imaging apparatus 100 having an enclosed imaging-optical-chamber 105, according to embodiments of the present invention, wherein imaging-optical-chamber 105 is enclosed by an optically sealed frame 120.

Preferably, all walls of frame walls 120 of optical chamber 105 are opaque, except for the glass-window. Preferably, all internal walls of the optical-chambers, except for the glass-windows, are painted black.

Duplex imaging apparatus 100 includes a computational unit 110 having a processor coupled with memory and a housing 111, an imaging device (camera unit) 170 situated inside imaging-optical-chamber 105, which imaging-optical chamber 105 further includes a first light source 160, a second light source 162, and a substantially horizontal glass-window 130 having preconfigured dimensions. Both sides of glass-window 130 are disposed in a preconfigured optical distance from the lens of camera unit 170 such that a document 50, placed on top of glass-window 130 is situated within the focus of the image sensor 172 of camera unit 170. Duplex imaging apparatus 100 further includes an activation unit (not shown) selected from a group including a physical button, a computerized software button, and a document motion detector.

Optionally, glass-window 130 is at least partially sloped towards a preferred imaging region, for example inwardly, such that a document, such as a plastic ID document, may translate thereon in order to be placed upon glass-window 130 in a preferred position. Optionally, for the same reason, glass-window 130 is at least partially tilted by tilting duplex imaging apparatus 100 itself.

Figure 2:
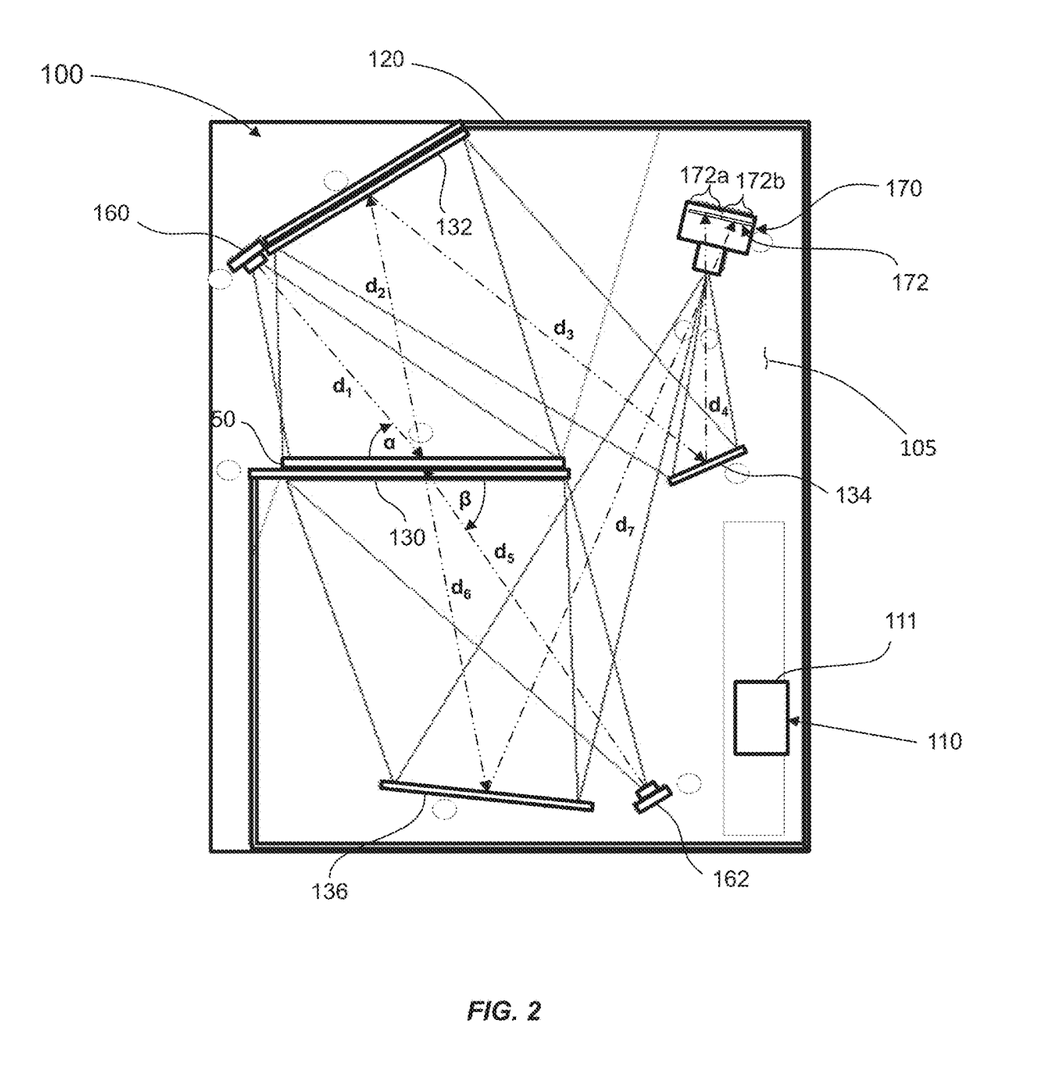
FIG. 2 further illustrates a first and second sets of folding mirrors configured to reflect the respective formed images towards the camera unit mounted inside an imaging-optical-chamber at a preconfigured special location and inclinations.
Figure 3:
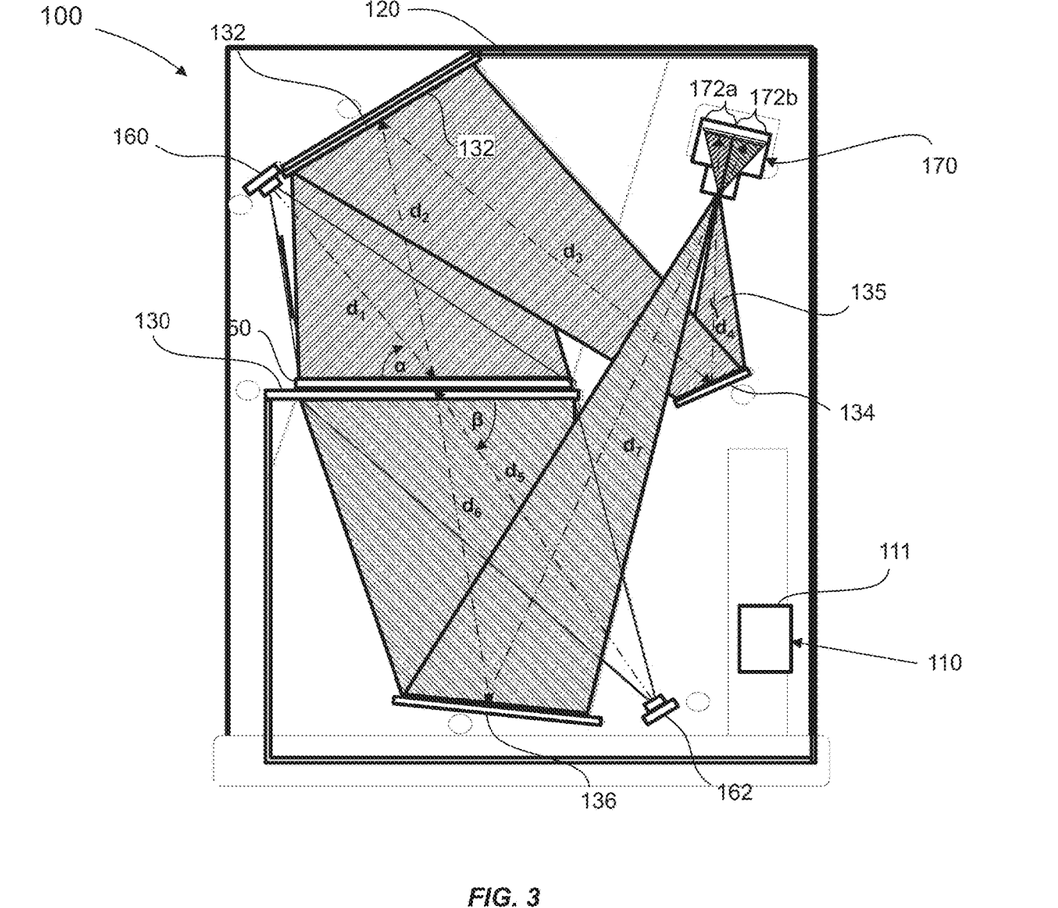
FIG. 3 is a further illustration of the duplex imaging apparatus shown in FIG. 1, wherein the flow of the image of the upper side of a document is shown flowing towards a preconfigured section of the image sensor of camera unit; and the flow of the image of the lower side of a document is shown flowing towards another preconfigured section of the image sensor of camera unit.

The first light source 160 is configured to illuminate the upper side of document 50, placed on top of glass-window 130, from a preconfigured spatial position, situated at a preconfigured distance $d_1$ from the upper side of document 50, at a preconfigured angle α with respect to the upper surface of document 50, as shown in FIGS. 2 and 3, which are also side view illustrations of a duplex imaging apparatus 100 as shown in FIG. 1. FIGS. 2 and 3 also outline the flow of the image of the upper side of document 50 towards the image sensor 172 of camera unit 170. The image of the upper side of document 50 is reflected towards folding mirror 132 that is situated at preconfigured spatial position and inclination, and at a preconfigured distance $d_2$ from the upper side of document 50.

From folding mirror 132, the flow of the image of the upper side of document 50 proceeds towards another folding mirror 134, which is situated at a preconfigured distance $d_3$ from folding mirror 132, at a preconfigured spatial inclination with respect to folding mirror 132. The image of the upper side of document 50 is then reflected from folding mirror 134 towards a first section 172a of image sensor 172 of camera unit 170, distant a distance $d_4$ from folding mirror 134.

The second light source 162 is configured to illuminate the lower side of document 50, placed on top of glass-window 130, from a preconfigured spatial position, situated at a preconfigured distance $d_5$ from the lower side of document 50, at a preconfigured angle β with respect to the lower surface of document 50, as shown in FIGS. 2 and 3. FIGS. 2 and 3 also outline the flow of the image of the lower surface of document 50 towards the image sensor 172 of camera unit 170. The image of the lower side of document 50 is then reflected towards a folding mirror 136, which is situated at a preconfigured distance de from the lower surface of document 50. The image of the lower side of document 50 then reflects from folding mirror 136 towards the second section 172b of image sensor 172 of camera unit 170, distant distance $d_7$ from folding mirror 136. It should be appreciated that both sides of document 50 can be imaged substantially simultaneously, in one take.

Image sensor 172 of camera unit 170 has now imaged both sides of document 50.

It should be appreciated that the spatial positioning of both the first and second light sources (160, 162), as well as the positioning and inclination of the folding mirrors (132, 134 and 136) are engineered such that the imaged light sources are outside the field of view (FOV) image sensor 172 of camera unit 170, and as such, do not reach image sensor 172.

Optionally, each individual light source (160, 162) is selected from the group of light sources type, including infra-red (IR), ultra violate (UV) and VL or any type of light that can affect the camera sensor.

Optionally, each individual light source (160, 162) is selected from the group including LED, halogen light sources and fluorescence image.

Preferably, all walls 120 of the optical chamber are opaque, except for the glass-window.

Preferably, all internal walls 120 of the optical-chambers, except for the glass-windows, are painted black.

Figure 4:
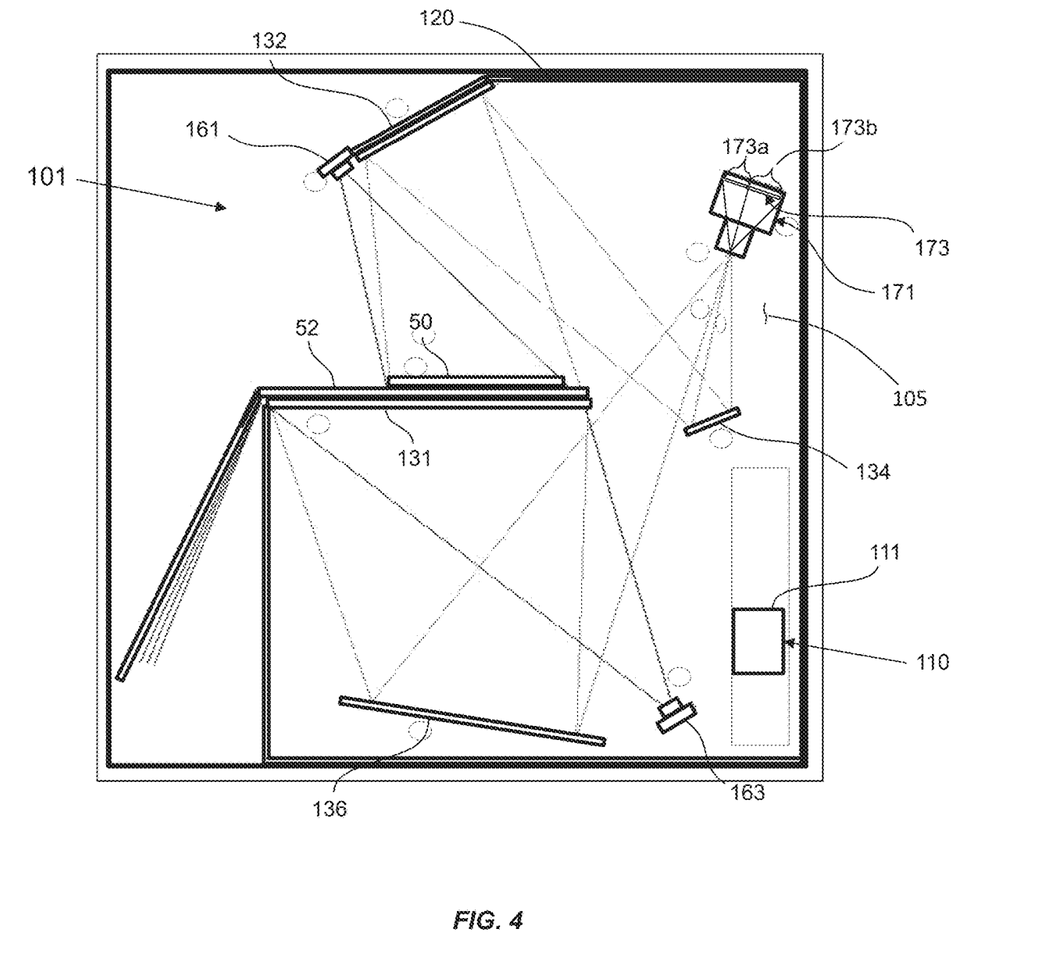
FIG. 4 is a side view illustration of an asymmetric duplex imaging apparatus having an enclosed imaging-optical-chamber, according to embodiments of the present invention, wherein duplex imaging apparatus is configured to image a selected respective sides of two documents having different dimensions.

Optionally, a duplex imaging apparatus such as, with no limitations, duplex imaging apparatus 100, can be designed to image one side of two different documents of different dimensions, such as a driver's license and another identifying document, substantially simultaneously in one take. Reference is now made to FIG. 4 that illustrates an asymmetric duplex imaging apparatus 101 that is configured to image one side of a driver's licenses 50 and identifying document 52 (e.g., passport).

FIG. 4 is a side view illustration of an asymmetric duplex imaging apparatus 101 having an enclosed imaging-optical-chamber 105, according to embodiments of the present invention, wherein imaging-optical-chamber 105 is enclosed by an optically sealed frame 120. Duplex imaging apparatus 101 includes a computational unit 110 having a processor coupled with memory and a housing 111, an imaging device (camera unit) 171 situated inside imaging-optical-chamber 105, which imaging-optical chamber 105 further includes a camera unit 171, a first light source 161, a second light source 163, and a substantially horizontal glass-window 131 having preconfigured dimensions. Both sides of glass-window 130 are disposed in a preconfigured optical distance from the lens of camera unit 171 such that a document 50, placed on top of glass-window 131 is situated within the focus of the image sensor 173 of camera unit 171.

As shown, by way of example, in FIG. 4, the imaged face of a document 52 is substantially larger than that of driver's licenses 50. Since the two documents may have different dimensions, the FOV 173 of camera unit 171 is pre-set such that image sensor 173 is subdivided directly proportional to the respective dimensions of the two documents.

Figure 5:
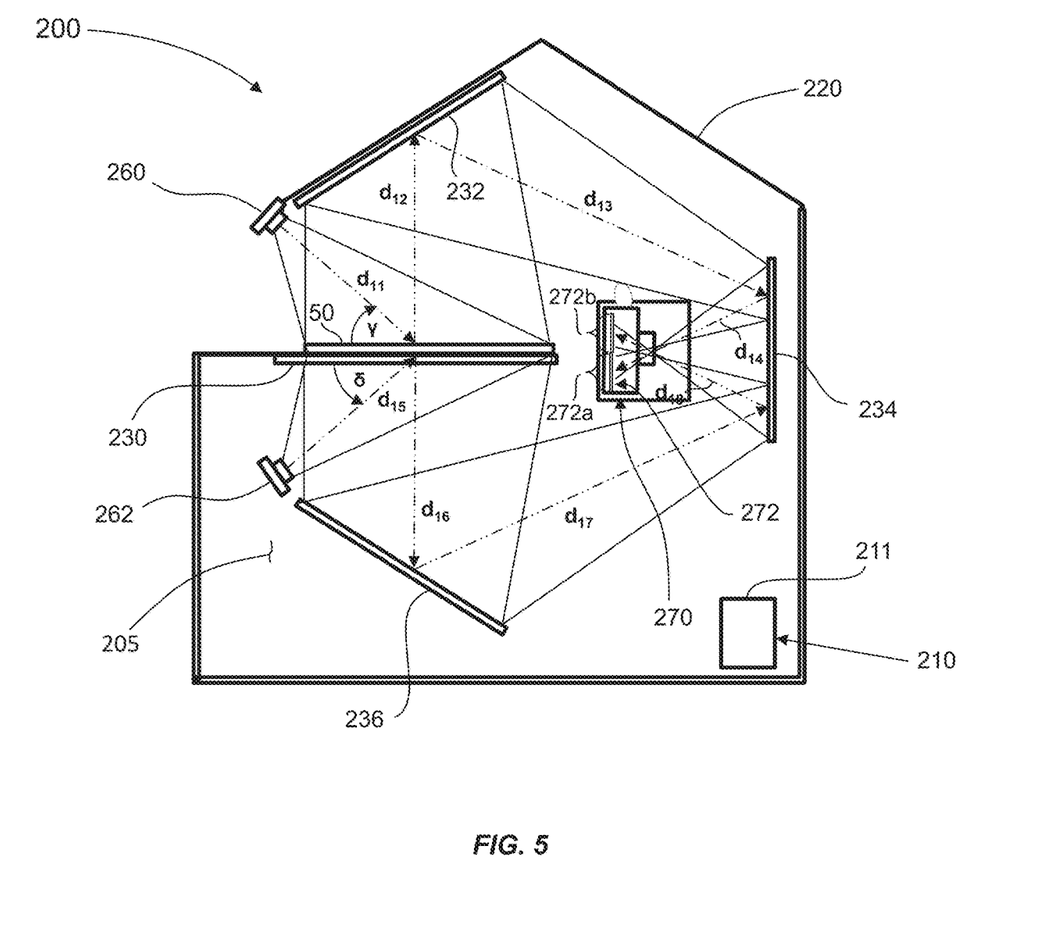
FIG. 5 is a side view illustration of another embodiment of a symmetric duplex imaging apparatus having an enclosed imaging-optical-chamber, according to embodiments of the present invention.

Reference is now also made to FIG. 5, a side view illustration of another example optional embodiment of a duplex imaging apparatus 200 having an enclosed imaging-optical-chamber 205, according to other embodiments of the present invention, wherein imaging-optical-chamber 205 is enclosed by an optically sealed frame 220. Preferably, all walls of frame walls 220 of optical chamber 205 are opaque, except for the glass-window. Preferably, all internal walls of the optical-chambers, except for the glass-windows, are painted black.

Duplex imaging apparatus 200 includes a computational unit 210 having a processor coupled with memory and a housing 211, an imaging device (camera unit) 270 situated inside imaging-optical-chamber 205, which imaging-optical chamber 205 further includes a first light source 260, a second light source 262, and a substantially horizontal glass-window 230 having preconfigured dimensions. Both sides of glass-window 230 are disposed in a preconfigured optical distance from the lens of camera unit 270 such that a document 50, placed on top of glass-window 230 is situated within the focus of the image sensor 272 of camera unit 270.

Optionally, glass-window 230 is at least partially sloped towards a preferred imaging region, for example inwardly, such that a document, such as a plastic ID document, may translate thereon in order to be placed upon glass-window 230 in a preferred position. Optionally, for the same reason, glass-window 230 is at least partially tilted by tilting duplex imaging apparatus 200 itself.

The first light source 260 is configured to illuminate the upper side of document 50, placed on top of glass-window 230, from a preconfigured spatial position, situated at a preconfigured distance du from the upper side of document 50, at a preconfigured angle γ with respect to the upper surface of document 50, as shown in FIG. 5. The flow of the image of the upper side of document 50 towards the image sensor 272 of camera unit 270 reflects towards folding mirror 232 that is situated at preconfigured spatial position and inclination, and at a preconfigured distance $d_{12}$ from the upper side of document 50.

From folding mirror 232, the flow of the image of the upper side of document 50 proceeds towards another folding mirror 234, which is situated at a preconfigured distance $d_{13}$ from folding mirror 232, at a preconfigured spatial inclination with respect to folding mirror 232. The image of the upper side of document 50 is then reflected from folding mirror 234 towards a first section 272a of image sensor 272 of camera unit 270, distant a distance $d_{14}$ from folding mirror 234.

The second light source 262 is configured to illuminate the lower side of document 50, placed on top of glass-window 230, from a preconfigured spatial position, situated at a preconfigured distance dis from the lower side of document 50, at a preconfigured angle δ with respect to the lower surface of document 50. The image of the lower surface of document 50 is configured to flow towards image sensor 272 of camera unit 270. The image of the lower side of document 50 is reflected towards a folding mirror 236, which is situated at a preconfigured distance $d_{16}$ from the lower surface of document 50. From folding mirror 236, the flow of the image of the lower side of document 50 proceeds towards folding mirror 234, which is situated at a preconfigured distance $d_{17}$ from folding mirror 236, at a preconfigured spatial inclination with respect to folding mirror 236.

The image of the lower side of document 50 is then reflected from folding mirror 234 towards the second section 272b of image sensor 272 of camera unit 270, distant distance $d_{18}$ from folding mirror 234. It should be appreciated that both sides of document 50 can be imaged substantially simultaneously, in one take.

Image sensor 272 of camera unit 270 has now been imaged with the images of both sides of document 50.

It should be appreciated that the spatial positioning of both the first and second light sources (260, 262), as well as the positioning and inclination of the folding mirrors (232, 234 and 236) are engineered such that the imaged light sources are outside the FOV image sensor 272 of camera unit 270, and as such, do not reach image sensor 272.

Optionally, each individual light source (260, 262) is selected from the group of light sources type, including infra-red (IR), ultra violate (UV) and VL or any type of light that can affect the camera sensor.

Optionally, each individual light source (260, 262) is selected from the group including LED, halogen light sources and fluorescence image.

Preferably, all walls 220 of the optical chamber are opaque, except for the glass-window.

Preferably, all internal walls 220 of the optical-chambers, except for the glass-windows, are painted black.

Optionally, a duplex imaging apparatus such as, with no limitations, duplex imaging apparatus 200, can be designed to image one side of two different documents of different dimensions, such as a driver's license and another identifying document, substantially simultaneously in one take.

It should be appreciated that numerous geometrical configurations among the light sources, the respective folding mirrors and the camera positions are possible, such that image sensor 272 of camera unit 270 receives the images of both the upper and lower sides of document 50, wherein both the first and second light sources (260, 262) are spatially positioned such that each illuminate the respective surface of the document in a preconfigured angle, such that the imaged light sources are fall outside the FOV image sensor 272.

Figure 6:
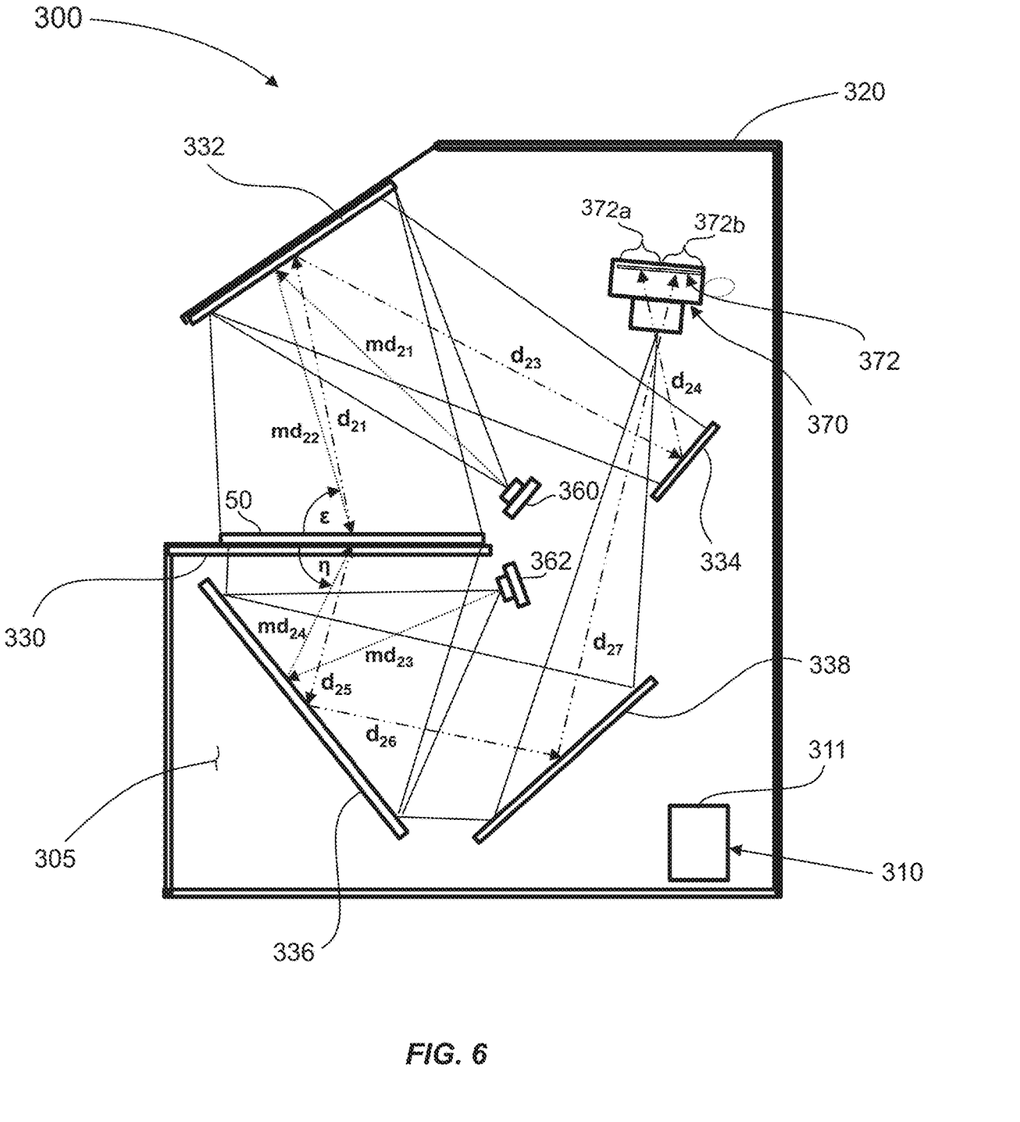
FIG. 6 further illustrates a first and second sets of folding mirrors configured to reflect the respective formed images towards the camera unit mounted inside an imaging-optical-chamber at a preconfigured special location and inclinations.

FIG. 6 is a side view illustration of another embodiment of a duplex imaging apparatus 300 having an enclosed imaging-optical-chamber 305, according to embodiments of the present invention, wherein imaging-optical-chamber 305 is enclosed by an optically sealed frame 320. Preferably, all walls of optical chamber 305 are opaque, except for the glass-window. Preferably, all internal walls of the optical-chambers, except for the glass-windows, are painted black.

Duplex imaging apparatus 300 includes a computational unit 310 having a processor coupled with memory and a housing 311, an imaging device (camera unit) 370 situated inside imaging-optical-chamber 305, which imaging-optical-chamber 305 further includes a first light source 360, a second light source 362, and a substantially horizontal glass-window 330 having preconfigured dimensions. Both sides of glass-window 330 are disposed in a preconfigured optical distance from the lens of camera unit 370 such that a document 50, placed on top of glass-window 330 is situated within the focus of the image sensor 372 of camera unit 370. Duplex imaging apparatus 300 further includes an activation unit (not shown) selected from a group including a physical button, a computerized software button, and a document motion detector.

Optionally, glass-window 330 is at least partially sloped towards a preferred imaging region, for example inwardly, such that a document, such as a plastic ID document, may translate thereon in order to be placed upon glass-window 330 in a preferred position. Optionally, for the same reason, glass-window 330 is at least partially tilted by tilting duplex imaging apparatus 300 itself.

The first light source 360 is configured to illuminate the upper side of document 50, placed on top of glass-window 330, from a preconfigured spatial position, and situated at a preconfigured distance $md_{21}$ from a folding mirror 332 that is situated at preconfigured spatial position and inclination, and at a preconfigured distance $d_{21}$ from the upper side of document 50.

Folding mirror 332, that is distant $d_{21}$ from the upper side of document 50, is also situated at a preconfigured angle & with respect to the upper surface of document 50, as shown in FIG. 6. FIG. 6 also outlines the flow of a reflected image of the upper side of document 50 towards folding mirror 332 that is situated at preconfigured spatial position and inclination, and at a preconfigured distance $d_{21}$ from the upper side of document 50.

From folding mirror 332, the flow of the reflected image of the upper side of document 50 proceeds towards another folding mirror 334, which is situated at a preconfigured distance $d_{23}$ from folding mirror 332, at a preconfigured spatial inclination with respect to folding mirror 332. The image of the upper side of document 50 is then reflected from folding mirror 334 towards a first section 372a of image sensor 372 of camera unit 370, distant a distance $d_{24}$ from folding mirror 334.

It should be appreciated that folding mirror 332 serves both to forward the illumination light of first light source 360 towards the upper side of document 50; and to forward the image of the upper side of document 50 towards first section 372a of image sensor 372 of camera unit 370.

The second light source 362 is configured to illuminate the lower side of document 50, placed on top of glass-window 330, from a preconfigured spatial position and situated at a preconfigured distance $md_{22}$ from a folding mirror 336 that is situated at preconfigured spatial position and inclination, and at a preconfigured distance $d_{25}$ from the lower side of document 50.

Folding mirror 336 that is distant $d_{25}$ from the lower side of document 50, is also situated at a preconfigured angle n with respect to the lower surface of document 50, as shown in FIG. 6. FIG. 6 also outlines the flow of the image of the lower surface of document 50 towards folding mirror 336 that is situated at preconfigured spatial position and inclination, and at a preconfigured distance $d_{26}$ from the lower side of document 50.

From folding mirror 336, the flow of the reflected image of the lower side of document 50 proceeds towards another folding mirror 338, which is situated at a preconfigured distance $d_{27}$ from folding mirror 336, at a preconfigured spatial inclination with respect to folding mirror 336. The image of the lower side of document 50 is then reflected from folding mirror 338 towards a second section 372b of image sensor 372 of camera unit 370, distant distance $d_{27}$ from folding mirror 336.

It should be appreciated that folding mirror 336 serves both to forward the illumination light of second light source 362 towards the lower side of document 50, and to forward the image of the lower side of document 50 towards first section 372b of image sensor 372 of camera unit 370.

It should be appreciated that both sides of document 50 can be imaged substantially simultaneously, in one take.

Image sensor 372 of camera unit 370 has now imaged both sides of document 50.

It should be appreciated that the spatial positioning of both the first and second light sources (360, 362), as well as the positioning and inclination of the folding mirrors (332, 334, 336 and 338) are engineered such that the imaged light sources are outside the field of view (FOV) image sensor 372 of camera unit 370, and as such, do not reach image sensor 372

Optionally, each individual light source (360, 362) is selected from the group of light sources type, including infra-red (IR), ultra violate (UV) and VL or any type of light that can affect the camera sensor.

Optionally, each individual light source (360, 362) is selected from the group including LED, halogen light sources and fluorescence image.

Preferably, all walls 320 of the optical chamber are opaque, except for the glass-window.

Preferably, all internal walls 320 of the optical-chambers, except for the glass-windows, are painted black.

Optionally, a duplex imaging apparatus such as, with no limitations, duplex imaging apparatus 300, can be designed to image one side of two different documents of different dimensions, such as a driver's license and another identifying document, substantially simultaneously in one take.

Figure 7A:
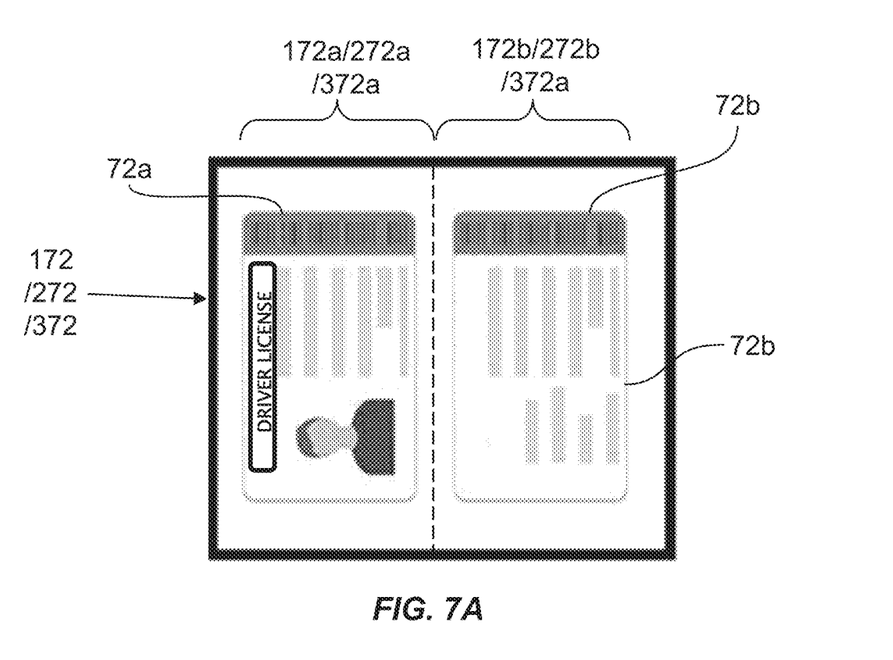
FIG. 7a illustrates the images formed on the respective image sensor of a camera, depicting two sides of the imaged document, or two documents of similar dimension.
Figure 7B:
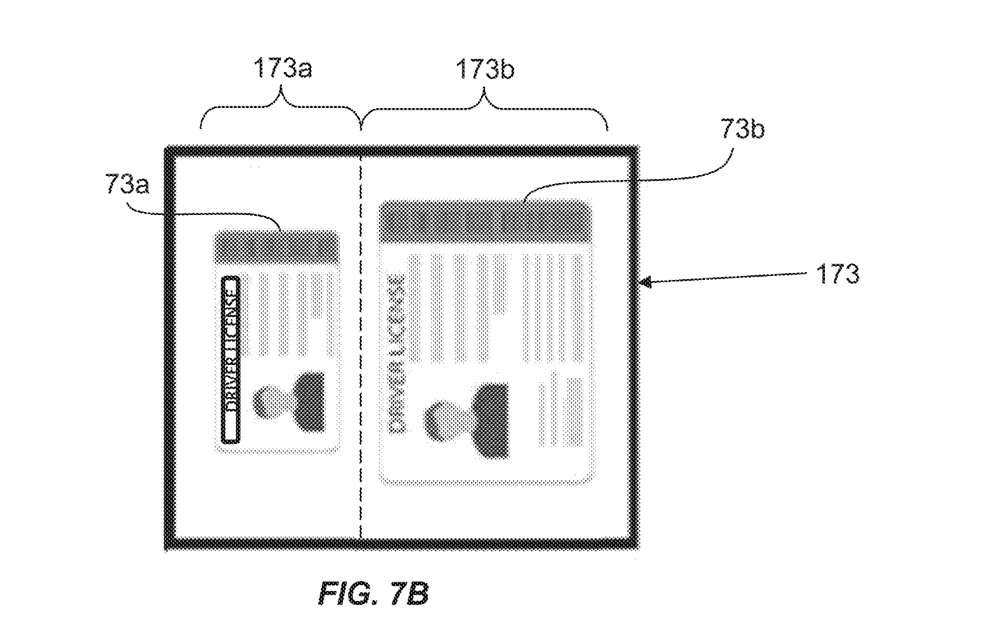
FIG. 7b illustrates the images formed on the respective image sensor of a camera, depicting two sides of two documents of different dimension.

Reference is now made to FIGS. 7a and 7b that illustrate the images formed on the respective image sensor. FIG. 7a illustrates the image sections 72a and 72b formed on the respective symmetric imaged sections 172a (or 272a, or 372a, respectively), and 172b of image sensor 172 (or 272, or 372, respectively), of duplex imaging apparatus 100 (or 200, or 300, respectively); while FIG. 7b illustrates the image sections 73a and 73b formed on the respective asymmetric imaged sections 173a and 173b of image sensor 173 of duplex imaging apparatus 101, wherein imaged sections 173a is configured to image the upper side of driver's license 50 (smaller size) and imaged sections 173b is configured to image the lower side of document 52 (larger size).

Although the present invention has been described with reference to the preferred embodiment and examples thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the following claims.

What is claimed is:

1. A duplex imaging apparatus for imaging at least one side of an identification document, having a first side and a second side, the duplex imaging apparatus comprising:
   (a) a processor;
   (b) memory coupled to operate with said processor;
   (c) an activation unit;
   (d) a camera unit mounted inside an imaging-optical-chamber at a preconfigured spatial location and inclination, wherein said camera unit includes an image sensor configured to receive the respective images of both the first (upper) side and the second (lower) side of the identification document;
   (e) a horizontal glass-window, wherein the identification document is operatively disposed on the external (upper) surface of said glass-window, wherein said second side of the identification document, is disposed adjacently to said external surface of said glass-window;
   (f) a first light-source configured to illuminate the upper side of the identification document placed on top of said glass-window, from a preconfigured spatial position, situated at a preconfigured distance ($d_1/d_{11}/md_{21}+md_{22}$) from the upper side of the identification document, at a preconfigured angle ($\alpha/\gamma/\varepsilon$) with respect to the upper surface of the identification document, configured to form an upper-side-image of the upper side of the identification document;
   (g) a first set of folding mirrors having at least one folding mirror, wherein each folding mirror is situated at preconfigured spatial position and inclination, and at a preconfigured distance from said upper side of the identification document, wherein said first set of folding mirrors is configured to forward said upper-side-image towards a first section of said image sensor;
   (h) a second light-source configured to illuminate the lower side of said identification document placed on top of said glass-window, from a preconfigured spatial position, situated at a preconfigured distance ($d_5/d_{15}/md_{23}+md_{24}$) from the lower side of the identification document, at a preconfigured angle ($\beta/\delta/\eta$) with respect to the lower surface of the identification document, configured to form a lower-side-image of the lower side of the identification document; and
   (i) a second set of folding mirrors having at least one folding mirror, wherein each folding mirror is situated at preconfigured spatial position and inclination, and at a preconfigured distance from said lower side of the identification document; wherein said second set of folding mirrors is configured to forward said lower-side-image towards a second section of said image sensor,
   wherein upon activating said activation unit, said processor facilitates optically acquiring an image of both said upper and lower sides of the identification document, by said image sensor, simultaneously.

2. The duplex imaging apparatus as in claim 1, wherein said first set, or said second set of folding mirrors, or said first set and said second set of folding mirrors or both said first set and said second sets of folding mirrors, comprise:
   (a) a first folding mirror that is situated at a preconfigured spatial position and inclination, and at a preconfigured distance from said upper side of the identification document; and
   (b) a second folding mirror that is situated at preconfigured spatial position and inclination, and at a preconfigured distance from said first folding mirror,
   wherein the illuminated upper side of the identification document forms a flow of the formed image of said upper side of the identification document towards said first folding mirror; and from said first folding mirror towards said second folding mirror; and from said second folding mirror towards a preconfigured section of said image sensor.

3. The duplex imaging apparatus as in claim 2, wherein either said first set of folding mirrors, or said second set of folding mirrors, or both said first and second sets of folding mirrors, comprise a third folding mirror that is situated at preconfigured spatial position and inclination, and at a preconfigured distance from said lower surface of the identification document, and from said third folding mirror towards a preconfigured section of said image sensor,
   (a) a first folding mirror that is situated at a preconfigured spatial position and inclination, and at a preconfigured distance from said lower side of the identification document; and
   (b) a second folding mirror that is situated at preconfigured spatial position and inclination, and at a preconfigured distance from said first folding mirror,
   and wherein the illuminated lower side of the identification document forms a flow of the formed image of said lower side of the identification document towards said third folding mirror; and from said third folding mirror towards said preconfigured section of said image sensor.

4. The duplex imaging apparatus as in claim 1, wherein said activation unit is selected from a group including a physical button, a computerized software button, and a document motion detector.

5. The duplex imaging apparatus as in claim 1, wherein both said first and second light sources are spatially positioned such that each illuminates the respective surface of the identification document in a preconfigured angle, such that the imaged light sources themselves fall outside the field of view (FOV) of said image sensor.

6. The duplex imaging apparatus as in claim 1, wherein said folding mirrors are spatially situated at a preconfigured spatial position and inclination to direct the flow of the respective imaged surface to the respective section of said image sensor.

7. The duplex imaging apparatus as in claim 1, wherein each individual light source of said light source configuration is selected from the group of light sources type, including infra-red (IR), ultra violate (UV) and VL or any type of light that can affect the camera sensor.

8. The duplex imaging apparatus as in claim 1, wherein each individual light source of said light source configuration is selected from the group including LED, halogen light sources and fluorescence image.

9. The duplex imaging apparatus as in claim 1, wherein said glass-window is at least partially down sloped towards a preferred imaging region of said glass-window.

10. The duplex imaging apparatus as in claim 1, wherein all walls of said optical chamber are opaque, except for said glass-window.

11. The duplex imaging apparatus as in claim 1, wherein the upper side and/or the lower side of the identification document is illuminated via a folding mirror.

12. A computerized method for imaging at least one side of a identification document, having a first side and a second side, the computerized method comprising the steps of:
   (a) providing a duplex imaging apparatus including:
      i. a processor;
      ii. an activation unit;
      iii. a camera unit mounted inside an imaging-optical-chamber at a preconfigured spatial location and inclination, wherein said camera unit includes an image sensor configured to receive the respective images of both the first (upper) side and the second (lower) side of the identification document;
      iv. a horizontal glass-window, wherein the identification document is operatively disposed on the external (typically the upper) surface of said glass-window, wherein said second side of the identification document, is disposed adjacently to said external surface of said glass-window;
      v. a first light-source configured to illuminate the upper side of the identification document placed on top of said glass-window, from a preconfigured spatial position, situated at a preconfigured distance ($d_1/d_{11}/md_{21}+md_{22}$) from the upper side of the identification document, at a preconfigured angle ($\alpha/\gamma/\varepsilon$) with respect to the upper surface of the identification document, configured to form an upper-side-image of the upper side of the identification document;
      vi. a first set of folding mirrors having at least one folding mirror, wherein each folding mirror is situated at preconfigured spatial position and inclination, and at a preconfigured distance from said upper side of the identification document, wherein said first set of folding mirrors is configured to forward said upper-side-image towards a first section of said image sensor;
      vii. a second light-source configured to illuminate the lower side of said identification document placed on top of said glass-window, from a preconfigured spatial position, situated at a preconfigured distance ($d_5/d_{15}/md_{23}+md_{24}$) from the lower side of the identification document, at a preconfigured angle ($\beta/\delta/\eta$) with respect to the lower surface of the identification document, configured to form a lower-side-image of the lower side of the identification document; and
      viii. a second set of folding mirrors having at least one folding mirror, wherein each folding mirror is situated at preconfigured spatial position and inclination, and at a preconfigured distance from said lower side of the identification document; wherein said second set of folding mirrors is configured to forward said lower-side-image towards a second section of said image sensor,
   wherein upon activating said activation unit, said processor facilitates acquiring an image of both said upper and lower sides of the identification document, by said image sensor, substantially simultaneously.

13. The computerized method as in claim 12, wherein said first set, or said second set of folding mirrors, or said first set and said second set of folding mirrors or both said first set and said second sets of folding mirrors, comprise:
   (a) a first folding mirror that is situated at preconfigured spatial position and inclination, and at a preconfigured distance from said upper side of the identification document; and
   (b) a second folding mirror that is situated at preconfigured spatial position and inclination, and at a preconfigured distance from said first folding mirror,
   wherein the illuminated upper side of the identification document forms a flow of the formed image of said upper side of the identification document towards said first folding mirror; and from said first folding mirror towards said second folding mirror; and from said second folding mirror towards a preconfigured section of said image sensor.

14. The computerized method as in claim 13, wherein either said first set of folding mirrors, or said second set of folding mirrors, or both said first and second sets of folding mirrors, comprise a third folding mirror that is situated at preconfigured spatial position and inclination, and at a preconfigured distance from said lower surface of the identification document, and from said third folding mirror towards a preconfigured section of said image sensor,
   (a) a first folding mirror that is situated at a preconfigured spatial position and inclination, and at a preconfigured distance from said lower side of the identification document; and
   (b) a second folding mirror that is situated at preconfigured spatial position and inclination, and at a preconfigured distance from said first folding mirror, and
   wherein the illuminated lower side of the identification document forms a flow of the formed image of said lower side of the identification document towards said third folding mirror; and from said third folding mirror towards said preconfigured section of said image sensor.

15. The computerized method as in claim 12, wherein said activation unit is selected from a group including a physical button, a computerized button, and a document motion detector.

16. The computerized method as in claim 12, wherein the first light source and the second light source are spatially positioned such that each illuminate the respective surface of the identification document in a preconfigured angle, such that the imaged light sources themselves fall outside the FOV of said image sensor.

17. The computerized method as in claim 12, wherein said folding mirrors are spatially situated at a preconfigured spatial position and inclination to direct the flow of the respective imaged surface to the respective section of said image sensor.

18. The computerized method as in claim 12, wherein said glass-window is down slopped towards a preferred imaging region.

19. The computerized method as in claim 12, wherein said glass-window is down slopped towards a preferred imaging region of said glass-window.

20. The computerized method as in claim 12, wherein the upper side and/or the lower side of the identification document is illuminated via a folding mirror.

* * * * *